United States Patent [19]

Yamazaki

[11] Patent Number: 4,760,465
[45] Date of Patent: Jul. 26, 1988

[54] ELECTRONIC BLACKBOARD WHICH DETECTS AN ABNORMAL OPERATING CONDITION BY READING A NON-IMAGE SECTION OF A WRITING SURFACE AT POWER-UP

[75] Inventor: Shuichi Yamazaki, Tokyo, Japan
[73] Assignee: Ricoh Company, Ltd., Tokyo, Japan
[21] Appl. No.: 802,989
[22] Filed: Nov. 27, 1985
[30] Foreign Application Priority Data
Nov. 29, 1984 [JP] Japan .................. 59-252393
Nov. 29, 1984 [JP] Japan .................. 59-252394
[51] Int. Cl.$^4$ .......... H04N 1/10; H04N 1/00; H04N 1/04; H04N 1/40
[52] U.S. Cl. .................. 358/293; 358/256; 358/280; 358/285
[58] Field of Search ........ 358/163, 282, 293, 294, 358/256, 280, 285, 293

[56] References Cited

U.S. PATENT DOCUMENTS

| | | | |
|---|---|---|---|
| 4,287,536 | 9/1981 | Wiggins | 358/294 |
| 4,587,568 | 5/1986 | Takayama et al. | 358/294 |
| 4,667,254 | 5/1987 | Araki et al. | 358/293 |
| 4,670,794 | 6/1987 | Araki et al. | 358/293 |

FOREIGN PATENT DOCUMENTS

| | | | |
|---|---|---|---|
| 50-143534 | 11/1975 | Japan . | |
| 53-98721 | 8/1978 | Japan | 358/282 |
| 54-53815 | 4/1979 | Japan | 358/294 |
| 57-81776 | 5/1982 | Japan | 358/256 |
| 58-106961 | 6/1983 | Japan | 358/285 |
| 58-136169 | 8/1983 | Japan | 358/285 |
| 58-159060 | 9/1983 | Japan | 358/293 |
| 58-170166 | 10/1983 | Japan | 358/256 |
| 59-25474 | 2/1984 | Japan | 358/294 |
| 59-189368 | 12/1984 | Japan . | |
| 60-7262 | 1/1985 | Japan | 358/256 |
| 60-229466 | 11/1985 | Japan | 358/256 |
| 61-76394 | 4/1986 | Japan . | |

OTHER PUBLICATIONS

Torok, G. P., "Electronic Blackboard-Have Chalk Will Travel", *1977 International Conference on Communications*, Jun. 12–15, 1977, Chicago, pp. 19.1–22-25.

Primary Examiner—James J. Groody
Assistant Examiner—Randall S. Svihla
Attorney, Agent, or Firm—Cooper & Dunham

[57] ABSTRACT

An electronic blackboard includes a writing sheet which extends between a pair of rollers, partly wound therearound, a CCD image sensor for scanning the surface of the writing sheet which is illuminated by a lamp, and a control system including a central processing unit (CPU) for controlling its overall operation. Upon power up, the writing sheet is set in its initial position and the CCD image sensor scans along a non-image line outside of a writing surface of the writing sheet. The presence or absence of any abnormality condition is determined depending on the number of black level data found in the image data read by the CCD image sensor. That is, if the non-image line is defined in a white background area, the image data read by the CCD image sensor with the writing sheet set in its initial position should not include any black level image data other than those produced by noise. Thus, if the number of black level image data is found to be significant, there must be some abnormal condition. The writing sheet is divided into a plurality of pages which can be selectively positioned at a writing position in accordance with a detection hole associated with each page.

14 Claims, 8 Drawing Sheets

ELECTRONIC BLACKBOARD WHICH DETECTS AN ABNORMAL OPERATING CONDITION BY READING A NON-IMAGE SECTION OF A WRITING SURFACE AT POWER-UP

BACKGROUND OF THE INVENTION

1. Field of the Invention

This invention generally relates to a panel type recording device for use in conference and class rooms, and, in particular, to an electronic blackboard capable of automatically recording information written on a recording surface.

2. Description of the Prior Art

For many years, a writing panel, such as a blackboard, has been used as an aid in conference, teaching, etc. The writing panel may take the form of a blackboard, though the color may be often actually green, in which case chalk is used as a writing utensil to write information on the blackboard. The writing panel also may take the form of a white panel, in which case a marker containing an erasable ink is used as a writing utensil. In either case, desired information can be written on the panel and the information can be erased for making the panel available for writing other information. However, the information written on the writing panel cannot be conveniently stored or recorded on a separate recording medium.

Under the circumstances, there has been developed a so-called electronic blackboard which is a recordable writing panel capable of recording information written on a writing medium. Such a recordable writing panel device is advantageous since it can produce the information written on the writing panel in the form of a hard copy and thus it is not necessary for somebody to rewrite the information on a separate sheet of paper. In such an electronic backboard, use is often made of a Charge Coupled Device (CCD) image sensor for reading the information written on the writing medium so as to convert the visual information into an electrical signal. For the CCD image sensor to function properly in reading the information, the degree of illumination on the surface of the writing medium must be maintained at an appropriate level; otherwise, no useful information can be recorded. The prior art electronic blackboard is believed not to be equipped to insure the fact that the proper condition for reading information written on the writing medium has been set prior to the reading operation by the CCD image sensor. Thus, sometimes, the information is incompletely read, leading to a hard copy having incomplete information.

SUMMARY OF THE INVENTION

It is therefore a primary object of the present invention to obviate the disadvantages of the prior art described above and to provide an improved electronic blackboard capable of insuring that a consistently good hard copy would be obtained of information written on a writing medium.

Another object of the present invention is to provide a recordable writing panel device which allows to electronically store information manually written on a writing medium.

A further object of the present invention is to provide an improved electronic blackboard capable of detecting any abnormal condition before a recording operation and providing an indication when inadequate conditions exist for information written on the board.

A still further object of the present invention is to provide an improved electronic blackboard reliable in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
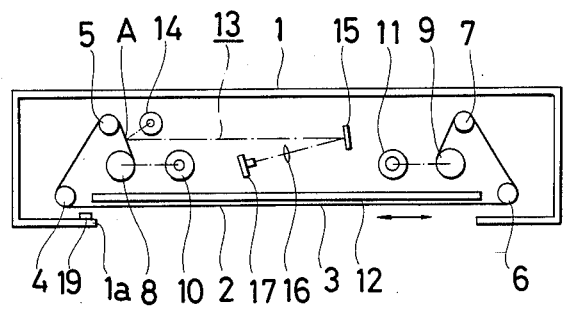
FIG. 1 is a schematic illustration showing an electronic blackboard constructed in accordance with one embodiment of the present invention.

Referring now to FIG. 1, there is schematically shown in cross section an electronic blackboard constructed in accordance with one embodiment of the present invention. As shown, the electronic blackboard includes a housing 1 which is generally rectangular in cross section and which is provided with an opening 1a in its front surface. Inside the housing 1 is provided a writing sheet 2 which is wound around rollers on both ends. The writing sheet 2 has on its front side a writing surface 3 on which information may be written and erased. In the present embodiment, the writing surface 3 is divided into 5 pages and only the first four pages may be recorded in the present embodiment as will be made clear later. As shown, the writing sheet 2 extends across the opening 1a of the housing 1 and has its both ends wound around driver rollers 8 and 9, respectively, after passing around guide rollers 4 and 5 and 6 and 7, respectively. These driver rollers 8 and 9 are operatively coupled to pulse motors 10 and 11, respectively, so that the driver rollers 8 and 9 are driven to rotate in the normal direction or the reversed direction, selectively, depending on the direction of rotation of the pulse motors 10 and 11. With the rotation of these driver rollers 8 and 9, the writing sheet 2 moves across the opening 1a and is wound around one of the driver rollers 8 and 9 while being unwound from the other.

Also provided in the housing 1 as located behind the writing sheet 2, extending substantially across the opening 1a and in parallel with the writing sheet 2, is a rear plate 12. Thus, the rear plate 12 serves as a support plate when some information is desired to be written on the writing sheet 2. The writing sheet 2 is normally moved from the right to the left across the opening 1a so that the writing sheet 2 is wound around the driver roller 8 while being unwound from the other driver roller 9. Also provided in the housing 1 is an image reading means 13 for reading an image written on the writing sheet 2 by scanning across its widthwise direction, i.e., from top to bottom, at a position A between the guide roller 5 and the driver roller 8. Described more specifically, a fluorescent lamp 14 is provided near the position A so that the writing surface A is slit-scanned at the position A. And, the light reflecting from the position A is lead into a CCD image sensor 17 through a mirror 15 and a lens 16 so that the CCD image sensor 17 converts the optical image formed thereon into an electrical signal. The image on the writing surface 3 thus read by the CCD image sensor 17 is then stored or printed on a sheet of paper, for example, by a thermal printer (not shown in FIG. 1) which may also be provided in the electronic blackboard.

Figure 2:
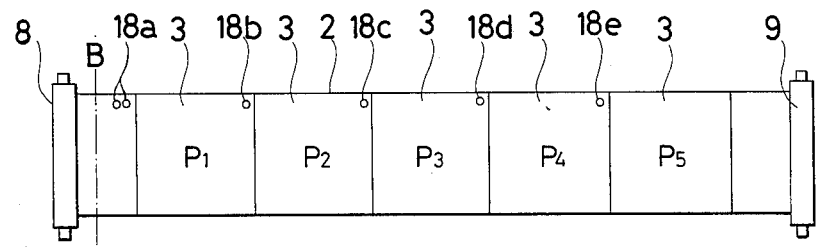
FIG. 2 is a schematic illustration showing a writing sheet provided in the electronic blackboard shown in FIG. 1.

FIG. 2 shows the overall structure of the writing sheet 2 as developed between both of the driver rollers 8 and 9. In the illustrated embodiment, the writing surface 3 is divided into five pages P1 through $P_5$ in succession, but since page $P_5$ cannot be moved past the slit-scanning exposure position A, the information written on page $P_5$ cannot be read by the CCD image sensor 17 and thus any hard copy of the image on page $P_5$ cannot be produced. Thus, only the information on pages $P_1$ through $P_4$ can be produced in the form of hard copy. The writing sheet 2 is provided with a plurality of detector holes 18, one for each corresponding page and located in front of each corresponding page. And, these detector holes 18 may be detected by a sensor 19 mounted on the housing 1 at the left side edge of the opening 1a as they move past the sensor 19. In the present embodiment, the detector hole 18a for the first page $P_1$ differs in structure from the rest (18b through 18e) and it is comprised of two holes thereby allowing to identify that the next page to be read is the first page $P_1$. With this structure, at the time of initialization after power up, the first page P1 of the writing surface 3 can be easily found by looking for the unique detector hole 18a in order to set the writing sheet 2 in its initial position.

Figure 3:
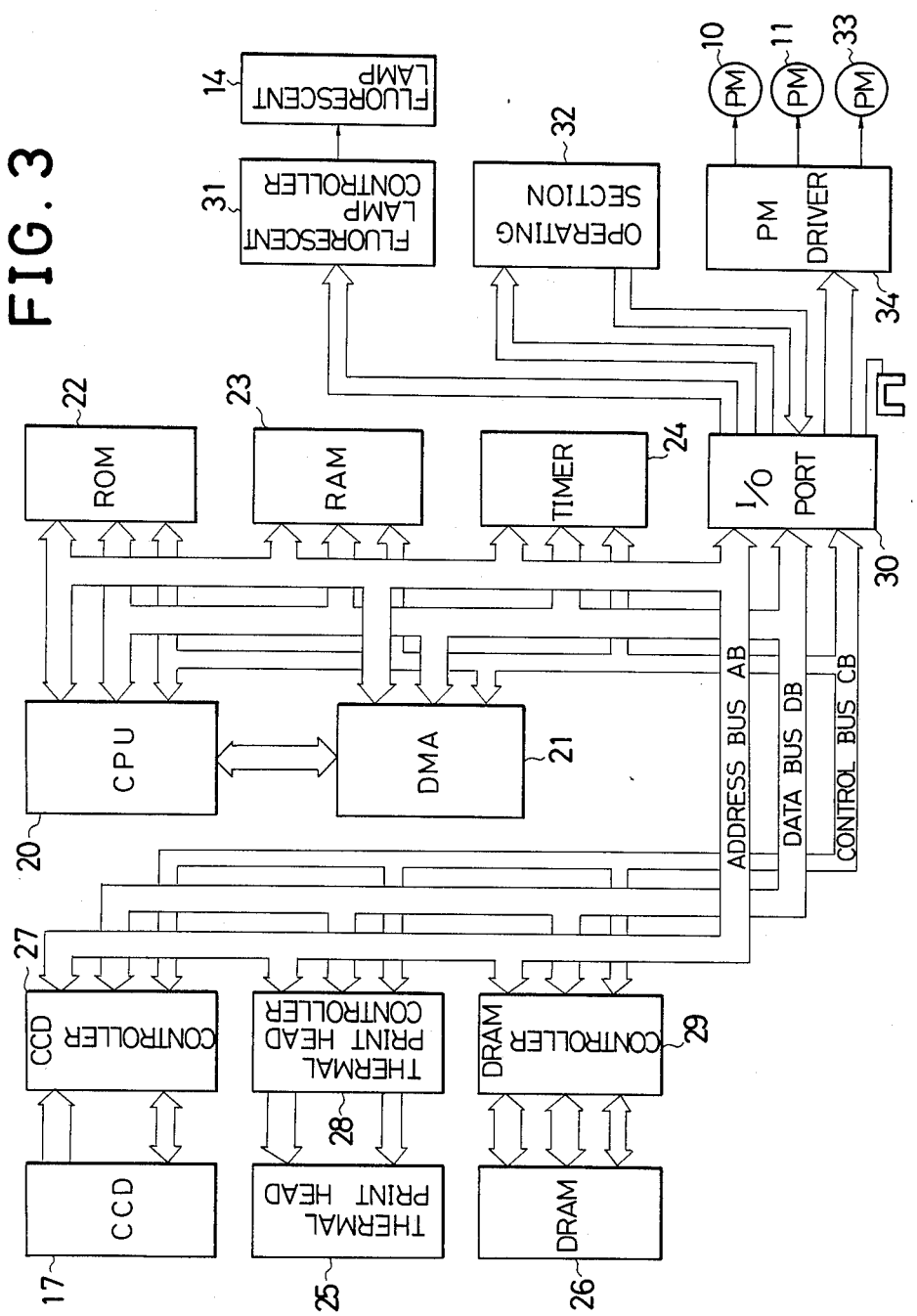
FIG. 3 is a block diagram showing an overall control system provided in the electronic blackboard shown in FIG. 1.
Figure 4:
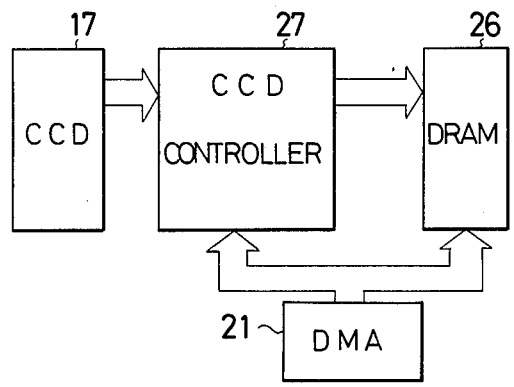
FIGS. 4 through 6 are block diagrams showing how signals are transmitted between selected elements shown in FIG. 3.
Figure 5:
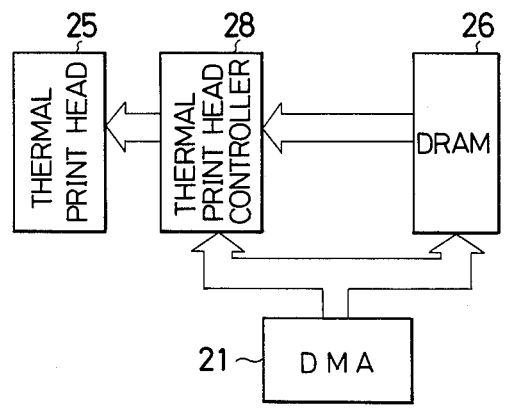
Figure 6:
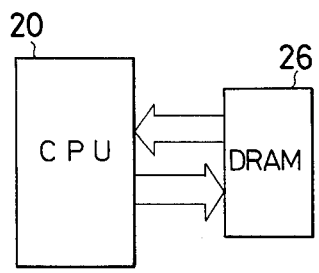

FIG. 3 shows an overall control circuit provided in the electronic blackboard of FIG. 1. As shown, the control circuit includes a central processing unit or simply CPU 20 which is connected to a direct memory access DMA controller 21. Also provided are a read only memory or simply ROM 22, a random access memory or simply RAM 23 and a timer 24 which are operatively connected to CPU 20 and DMA 21 through an address bus AB, a data bus DB and a control bus CB. The CCD 17, a thermal print head 25 and a dynamic random access memory or simply DRAM 26 are also provided as connected to the CPU 20 and the DMA 21 through the address bus AB, data bus DB and control bus CB through respective controllers 27, 28 and 29. Thus, the DMA 21 serves to transfer image data from the CCD 17 directly to the DRAM 26 (see FIG. 4), and also data may be transmitted from the DRAM 26 directly to the thermal print head 25 (see FIG. 5). In addition, there is provided an I/O port 30 connected to the CPU 20 and to a fluorescent lamp controller 31 for controlling the operation of the fluorescent lamp 14, to an operating section 32 and to a pulse motor driver 34 for controlling the operation of the pulse motors 10, 11 and a pulse motor 33 which functions to transport thermo-sensitive paper.

Figure 7:
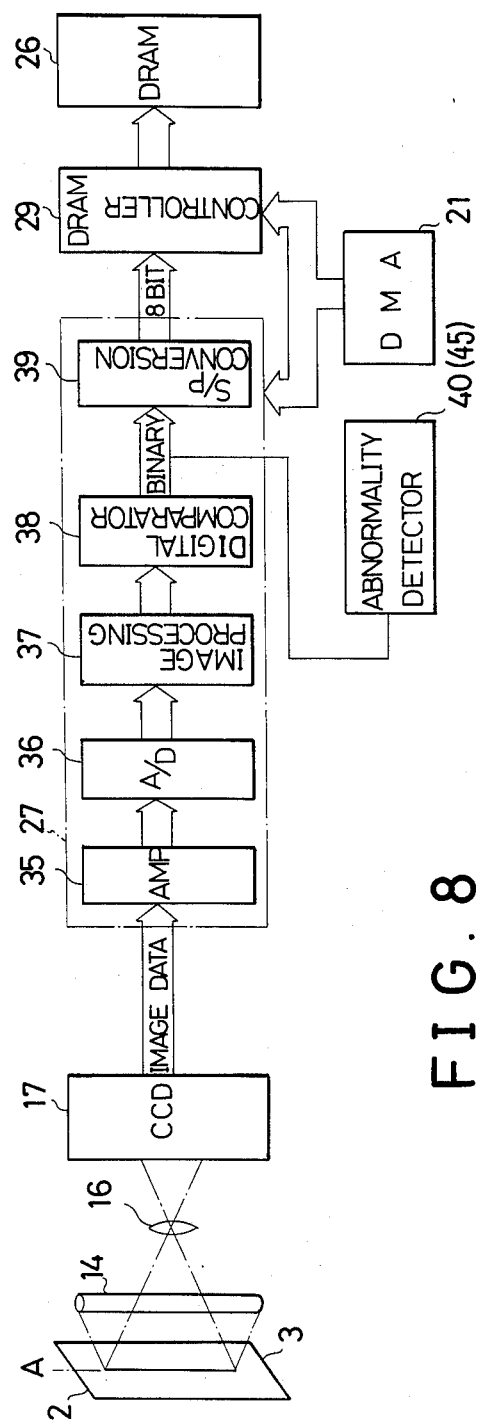
FIG. 7 is an illustration showing the sequence of steps in processing a visual image read by the CCD image sensor.

FIG. 7 schematically shows the specific structure of the CCD controller 27. As shown, an image data read from the writing surface 3 by the CCD image sensor 17 is converted into an electrical image signal which is then amplified by an amplifier 35, converted into digital data by an A/D converter 36, and subjected to image processing by an image processing circuit 37. Then, the signal output from the image processing circuit 37 is converted into a binary image signal by a digital comparator 38, and the binary image signal is then converted into an 8-bit parallel signal as being processed by a serial-to-parallel converting circuit 39. This 8-bit parallel signal is then supplied to the DRAM 26 through DRAM controller 29. In this manner, under the control of the DMA 21, the image data from the CCD image sensor 17 is stored into the DRAM 26 directly. In the structure shown in FIG. 7, there is also provided an abnormality detecting circuit 40 which receives the binary image signal output from the digital comparator 38.

Figure 8:
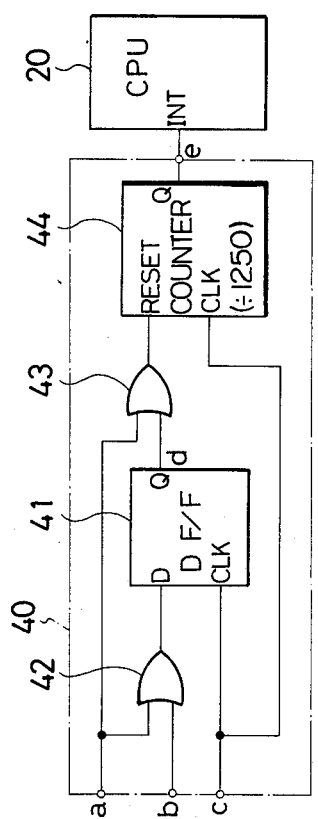
FIG. 8 is a block diagram showing the structure of an abnormality detecting circuit 40 shown in FIG. 7.

The detailed structure of this abnormality detecting circuit 40 is shown in FIG. 8. That is, as shown in FIG. 8, the abnormality detecting circuit 40 includes a D-type flip-flop 41 which has its CLK input terminal connected to receive a clock signal c and its D input terminal connected to receive an output signal from an OR gate whose one input terminal is connected to receive a valid image signal a and the other input terminal is connected to receive an image data b. It is to be noted that, for the image data b, its high level indicates white level (background level) and its low level indicates black level. The flip-flop 41 has its Q output terminal d connected to one input terminal of a two-input OR gate 43 which has the other input terminal connected to receive the valid image signal a. The OR gate 43 has its output terminal connected to a reset input terminal of a counter 44. The counter 44 has a CLK input terminal, which is also connected to receive the clock signal c, and an output terminal Q which is connected to the INT input terminal of the CPU 20 so as to supply its output signal e thereto.

As will be made clearer later, the value of the output signal supplied from the output terminal Q of the counter 44 is determined by the number of the binary image data signals obtained from a slit-scanning exposure for abnormality detection. In the present embodiment, the slit-scanning exposure for abnormality detection is a single line scanning, and the number of valid pixels in a single line scanning by the CCD image sensor 17 is 1,260. Thus, in consideration of faulty reception of binary image data due, for example, to noise, the safety factor D is determined as D=10, so that the count of the counter 44 is set as 1,260−10=1,250. That is, when the counter 44 has counted to 1,250 by the clock signal c, the output Q of the counter 44 is changed from its low level to its high level.

Figure 9:
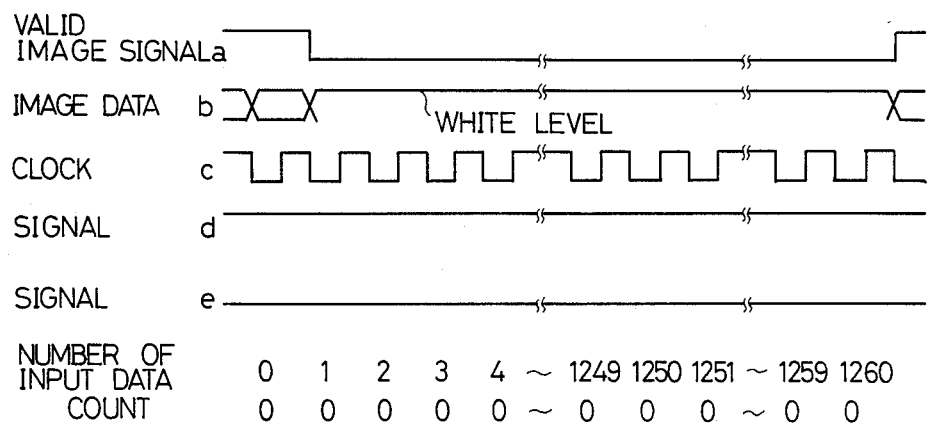
FIG. 9 is a timing diagram showing the operation under normal condition.

With this structure, the abnormality detecting operation in accordance with the present embodiment will be described with reference to the timing charts shown in FIGS. 9 and 10. Upon power up, an initialization operation for setting the writing sheet 2 in its home position is carried out. That is, the detection of the detection holes 18a through 18e is carried out by the sensor 19, and the writing sheet 2 is moved until the first page $P_1$ comes to be located at the opening 1a. In this case, since the detection hole 18a for the first page $P_1$ differs in structure from the other detection holes 18b through 18e, the first page $P_1$ can be easily found and located in position in registry with the opening 1a. Under the condition, in which the first page $P_1$ is located in position in registry with the opening 1a upon completion of the initialization operation, a B line provided on the writing sheet 2 (see FIG. 2) is located at the slit-scanning exposure position A shown in FIG. 1. Since this B line is located at non-image section outside of the writing surface 3 of the writing sheet 2, it is at white level and same as the background of the writing surface 3. This B line is illuminated by the fluorescent lamp 14 and the reflecting light from the B line position is lead into the CCD image sensor 17. And, the image data thus read by the CCD image sensor 17 is converted to a binary image data at the CCD controller 27. Thus, the image data b should be at high level if it is at white level and at low level if it is at black level.

The valid image signal a becomes low level at the time of outputting a valid image data; on the other hand, it becomes high level during the time other than the time of outputting a valid image data, so that the counter 44 is reset. The clock signal c is a control clock signal for controlling the operation of the CCD image sensor 17. The signal d, on the other hand, makes the output of the image data b possible at the rising edge of the clock signal c. When the value of the binary image data in the counter 44 has reached 1,250, the signal e becomes high level, which constitutes an interrupt input to the CPU 20. Thus, the binary value image data at the non-image position B is read correctly as white level (high level) data which is the same as the background level data. As long as the image data is at high level as shown in FIG. 9, the count of the counter 44 does not increase so that the count stays substantially at zero over 1,260 pixels along one scan line of the CCD image sensor 17. As a result, no output is produced from the counter 44, indicating the presence of the normal condition, so that no interrupt due to the presence of an abnormal condition is made to the CPU 20.

Figure 10:
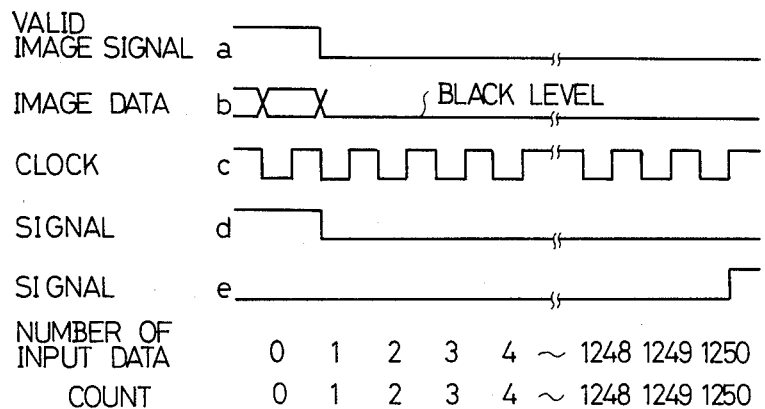
FIG. 10 is a timing diagram showing the operation under abnormal condition.
Figure 11:
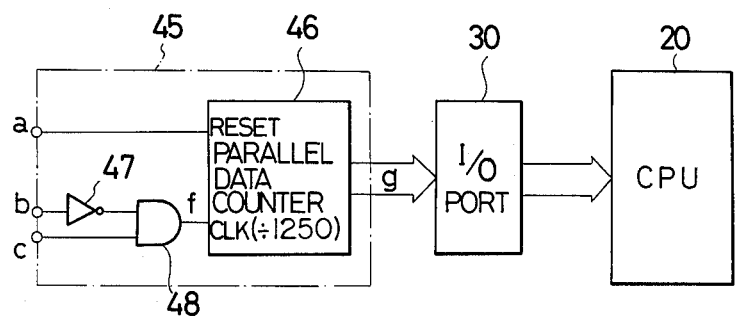
FIG. 11 is a block diagram showing the abnormality detecting circuit constructed in accordance with another embodiment of the present invention.

On the other hand, as shown in FIG. 10, if the scanning of the image data along the non-image position B indicates black level, the image data becomes low level, which allows the count of the counter 44 to increase thereby possibly exceeding the value of 1,250. When the count exceeds the value of 1,250, it indicates the occurrence of abnormality condition, so that the output Q is produced from the counter 44 to apply an interrupt condition to the CPU 20, whereby an abnormality process is carried out.

The binary image data of the image data read along the non-image line B becomes black level when the fluorescent lamp 14 is not lit, when CCD image sensor 17 is malfunctioning, when DRAM 26 is malfunctioning, etc. And, thus, in accordance with the present invention, the abnormality condition, caused not only by the illumination failure by the fluorescent lamp 14 but also by any other elements, can be detected advantageously. When such an abnormality condition has been detected, then it is only necessary to carry out the abnormality processing to rectify the problem causing such an abnormality condition. As a result, further operations, such as copy making, can be halted temporarily until the abnormality has been eliminated.

Now, referring to FIGS. 11 through 14, another embodiment of the present invention will be described. In this embodiment, there is provided another abnormality detecting circuit 45 connected to the digital comparator 38 of the CCD controller 27. This abnormality detecting circuit 45 includes a parallel data counter 46 which has its RESET input terminal connected to receive the valid image signal and its CLK input signal connected to receive a signal f output from an output terminal of an AND gate 48 whose one input terminal is connected to receive the image data b thorough an inverter 47 and the other input terminal is connected to receive the clock signal c. The counter 46, on the other hand, has its output terminal connected to supply its output signal g to the I/O port 30 which is then connected to supply its output signal to the CPU 20.

Figure 12:
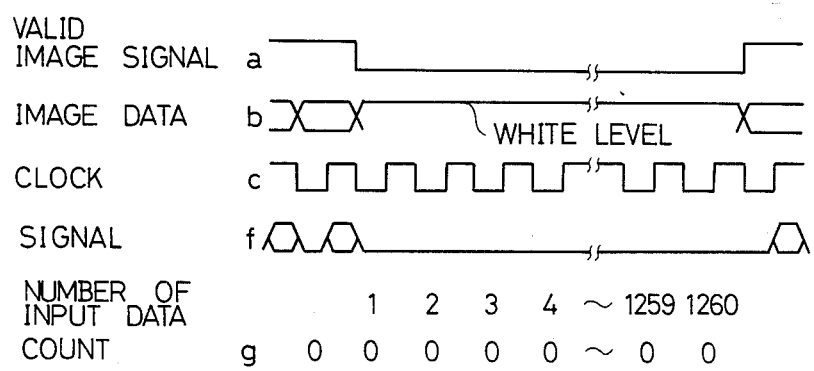
FIG. 12 is a timing diagram showing the operation under normal condition.
Figure 13:
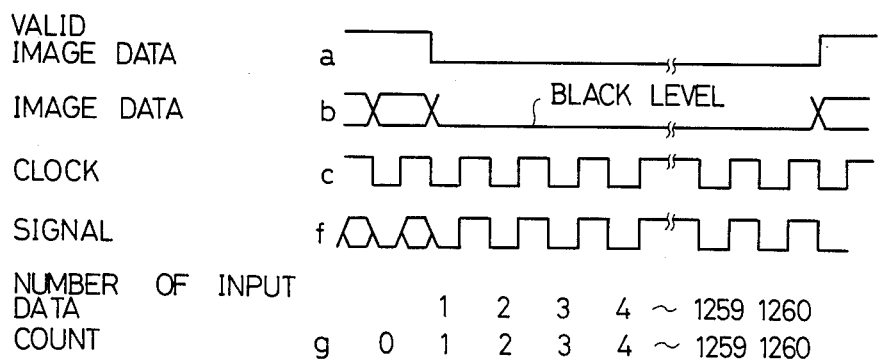
FIG. 13 is a timing diagram showing the operation under abnormal condition.
Figure 14:
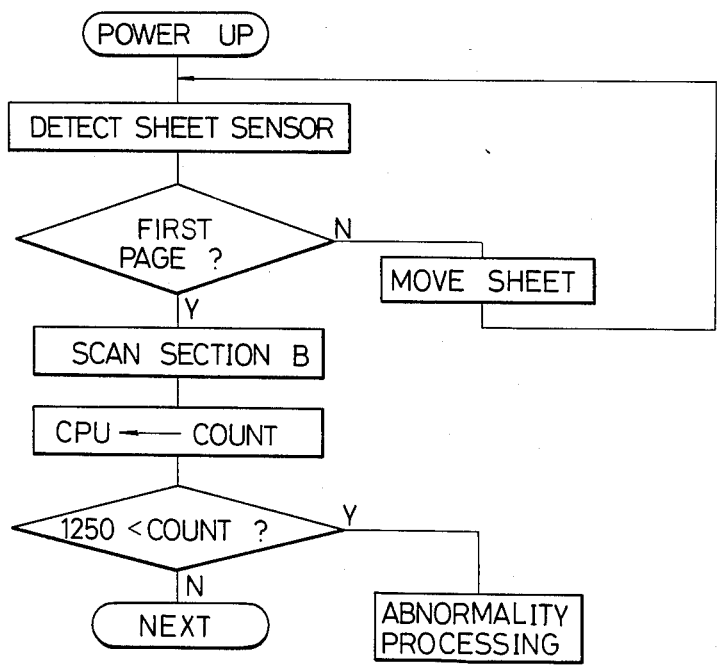
FIG. 14 is a flow chart showing the sequence of steps for detecting an abnormal condition.

With this structure, in association with the input data supplied, the parallel counter 46 counts the number of black level image data. And, as shown in FIG. 12, under the normal condition, the image data are all at while level so that the count does not increase. On the other hand, as shown in FIG. 13, if the image data read along the non-image line B are judged as black level data, the count of the counter 46 increases. And, at the time of completion of the slit-scanning exposure for a single line (1,260 pixels) along the non-image line B, the count g of the parallel counter 46 is supplied to the CPU 20 through the I/O port 30, and, thus, it is the CPU 20 that determines whether the abnormality condition exists or not based on the value of the count g. The sequence of this abnormality detecting operation is shown in FIG. 14 in the form of a flow chart.

Figure 15:
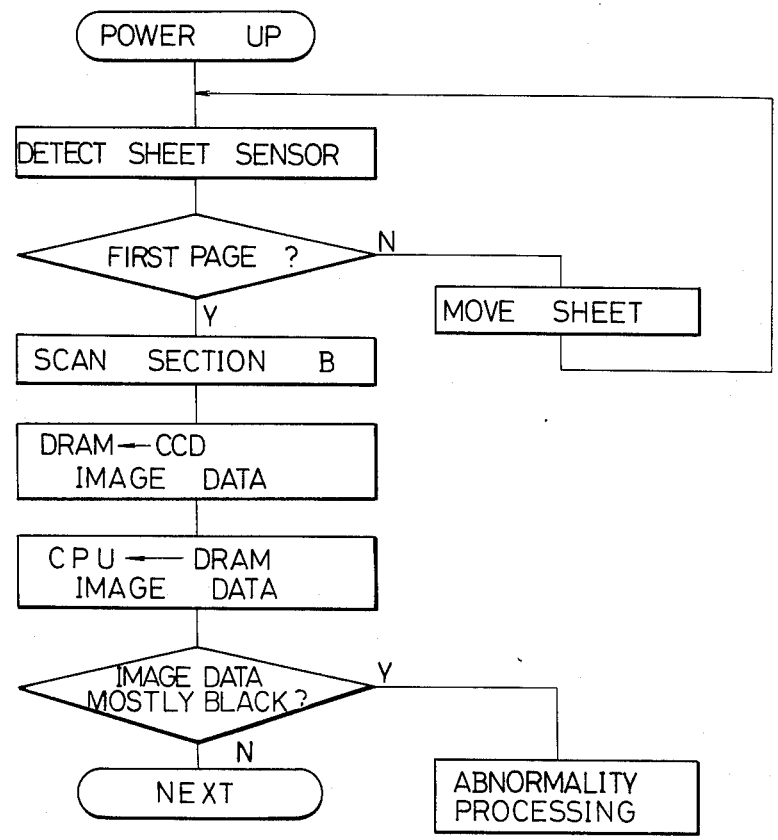
FIG. 15 is a flow chart showing the sequence of steps for detecting an abnormal condition in accordance with a further embodiment of the present invention.

A further embodiment of the present invention will now be described with particular reference to FIG. 15. In this embodiment, as different from the previously described embodiments, there is no extra abnormality detecting circuit, such as 40 and 45. Instead, as shown in FIG. 15, the non-image line B is illuminated by the fluorescent lamp 14 and the image data along the non-image line B is read by the CCD image sensor 17 as initial image data and then stored into the DRAM 26. Then, the initial image data thus stored in the DRAM 26 is supplied to the CPU 20 where the initial data are examined as to whether they are mostly white, indicating the presence of a normal condition, or mostly black, indicating the presence of an abnormal condition.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An electronic blackboard oomprising:
   a writing sheet having a predetermined length, extending along a predetermined path, and having its ends connected to a pair of driver rollers spaced apart over a predetermined distance from each other, said writing sheet having a writing surface on one surface thereof, said writing sheet also having a non-image section located outside of said writing surface;

driving means for rotating at least one of said driver rollers so as to move said writing sheet along said predetermined path thereby causing said writing sheet to be partially wound onto one of said driver rollers while being partially unwound from the other of said driver rollers;

image reading means for reading an image on said writing sheet by scanning across the width of said writing sheet;

means for making a hard copy of said image read by said image reading means;

control means for controlling the operation of said electronic blackboard, said control means causing said writing sheet to be located at a predetermined initial position when said electronic blackboard is turned on and causing said image reading means to read image data from said non-image section of said writing sheet; and abnormality detecting means for detecting the presence of a selected abnormal condition from the image data read by said image reading means from said non-image section of said writing sheet.

2. The electronic blackboard of claim 1 further comprising a housing which is provided with an opening which partially exposes said writing sheet at a location along said predetermined path.

3. The electronic blackboard of claim 2 further comprising a rear plate disposed extending along and behind said writing sheet and substantially across said opening.

4. The electronic blackboard of claim 2 wherein said image reading means includes a light source for illuminating said writing sheet at an exposure position, a CCD image sensor and an optical system for directing light reflected from said writing sheet at said exposure position to said CCD image sensor.

5. The electronic blackboard of claim 1 wherein the data read from said non-image section of the writing sheet can comprise data elements signifying black and/or white elemental areas of said section, and said abnormality detecting means includes a counter for counting the number of data elements signifying black elemental areas in the image data read by said reading means from said non-image section, wherein the presence of the selected abnormal condition is determined by comparing the count of said counter with a predetermined number.

6. The electronic blackboard of claim 5 wherein said control means includes a central processing unit and said counter is connected to supply its count to said central processing unit.

7. The electronic blackboard of claim 6 wherein said counter is a parallel data counter and said control means further includes an I/O port which is connected to receive the count of said counter and to supply the count to said central processing unit.

8. An electronic blackboard comprising:

a writing sheet which has a predetermined length, extends along a predetermined path and is movable therealong and has its ends connected to a pair of driver rollers spaced apart over a predetermined distance from each other, wherein said writing sheet further has a writing surface on one surface thereof and a non-image section located outside of said writing surface, said writing surface being divided into a plurality of writing surface sections arranged side-by-side in the direction along which said writing sheet is movable and said writing sheet being provided with a plurality of markers each of which is associated with a corresponding one of said plurality of writing surface sections;

driving means for rotating at least one of said driver rollers so as to move said writing sheet along said predetermined path and to thereby cause said writing sheet to be partially wound onto one of said driver rollers while being partially unwound from the other of said driver rollers;

a housing which encloses said driving means at least partly and has an opening which is large enough to allow access to at least one of said writing surface sections at a time;

image reading means for reading an image on said writing sheet by scanning across the width of said writing sheet;

means for making hard copy of said image read by said image reading means;

control means for controlling the operation of said electronic blackboard; and sensing means for sensing said plurality of markers one by one so as to determine when a particular one of said plurality of writing surface sections is located at said opening.

9. The electronic blackboard of claim 8 wherein the marker which corresponds to an endmost writing surface section is structured to be different from the rest of said plurality of markers.

10. An electronic blackboard comprising:

a writing sheet having a predetermined length, extending along a predetermined path, and having its ends connected to a pair of driver rollers spaced apart over a predetermined distance from each other, said writing sheet having a writing surface on one surface thereof, said writing sheet also having a non-image section located outside of said writing surface;

driving means for rotating at least one of said driver rollers so as to move said writing sheet along said predetermined path thereby causing said writing sheet to be partially wound onto one of said driver rollers while being partially unwound from the other of said driver rollers;

image reading means for reading an image on said writing sheet by scanning across the width of said writing sheet;

storing means for storing said image read by said image reading means; and control means for controlling the operation of said electronic blackboard, said control menas causing said writing sheet to be located at a predetermined initial position when said electronic blackboard is turned on and causing said image reading means to read image data from said non-image section of said writing sheet and to store said image data thus read into said storing means, wherein said control means includes means for detecting the presence of an abnormal condition from the image data stored in said storing means.

11. The electronic blackboard of claim 10 wherein said storing means includes a dynamic random access memory in which said image data read by said reading means from said non-image section of said writing sheet is stored and said control means includes a central processing unit which is operatively connected to said dynamic random access memory to determine the presence of the abnormal condition by using the image data stored in said dynamic random access memory.

12. An electronic blackboard comprising:
   a writing sheet having a side which has a writing surface and a non-writing surface spaced apart from said writing surface;
   a transporter for transporting the sheet along a path to present selected portions thereof to a writing position at which the writing surface can be written on, and to an imaging position at which the writing and non-writing surfaces can be imaged at different times;
   wherein said writing sheet comprises a plurality of pages of writing surface arranged along the direction in which the sheet is transported and a respective mark associated with each page;
   a positioning circuit which selectively aligns a first one of the pages with a selected position at an initialization of the blackboard and selectively aligns subsequent pages with said selected position during operation of the blackboard in accordance with said marks;
   an imager which reads the protion of the sheet which is at the imaging position, along a scan line which is transverse to the direction in which the sheet is transported by the transporter, to generate an output indicative of the information present on the sheet along the scan line;
   an abnormality detecting circuit responsive to said imager output when the non-writing surface of the sheet is at the imaging position to produce an error signal when the imager output is indicative of information which differs by more than a selected threshold from a selected standard; and
   means for utilizing the error signal to control the electronic blackboard.

13. An electronic blackboard as in claim 12 in which the imager generates said output in the form of a succession of data signals indicative of the information present on the sheet at a corresponding succession of pixels along the scan line.

14. An electronic blackboard as in claim 13 wherein said data signals can each have one of two values representing two kinds of pixels, and wherein the abnormality of detecting circuit produces said error signal when the succession of data signals indicates that the number of pixels of one of said two kinds of pixels is greater than a selected threshold number.

* * * * *